United States Patent
Huang et al.

(10) Patent No.: US 12,273,170 B2
(45) Date of Patent: Apr. 8, 2025

(54) METHODS AND DEVICES FOR BEAMFORMING

(71) Applicant: Telefonaktiebolaget LM Ericsson (publ), Stockholm (SE)

(72) Inventors: Yue Huang, Guangzhou (CN); Jiying Xu, Beijing (CN); Hao Zhang, Guangzhou (CN); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/036,449

(22) PCT Filed: Dec. 18, 2020

(86) PCT No.: PCT/CN2020/137664
§ 371 (c)(1),
(2) Date: May 11, 2023

(87) PCT Pub. No.: WO2022/126619
PCT Pub. Date: Jun. 23, 2022

(65) Prior Publication Data
US 2023/0421216 A1    Dec. 28, 2023

(51) Int. Cl.
*H04B 7/06* (2006.01)
*H04B 7/0413* (2017.01)

(52) U.S. Cl.
CPC ........ *H04B 7/0617* (2013.01); *H04B 7/0626* (2013.01); *H04B 7/0413* (2013.01)

(58) Field of Classification Search
CPC .................................................. H04B 7/0617
(Continued)

(56) References Cited

U.S. PATENT DOCUMENTS

| | | | |
|---|---|---|---|
| 6,694,155 B1 * | 2/2004 | Chin | H04L 25/0248 455/562.1 |
| 8,310,980 B2 * | 11/2012 | Zorba Barah | H04B 7/18534 455/12.1 |

(Continued)

FOREIGN PATENT DOCUMENTS

| | | |
|---|---|---|
| CN | 104737481 A | 6/2015 |
| CN | 104753832 A | 7/2015 |

(Continued)

OTHER PUBLICATIONS

Extended European Search Report for mailed Jul. 30, 2024 for European Patent Application No. 20965633.9, 8 pages.
(Continued)

*Primary Examiner* — Lihong Yu
(74) *Attorney, Agent, or Firm* — Sage Patent Group

(57) ABSTRACT

Various embodiments of the present disclosure provide a method for beamforming. The method which may be at a network node and includes: obtaining channel information of a terminal device; determining a self-correlation factor of the terminal device according to the channel information; determining main lobe width according to a relationship between self-correlation factor and main lobe width; determining a weight vector on at least one transmitting antenna according to the determined main lobe width; and transmitting a message using the weight vector on the at least one transmitting antenna, to the terminal device.

11 Claims, 13 Drawing Sheets

(58) Field of Classification Search
USPC .......................................................... 375/267
See application file for complete search history.

(56) References Cited

U.S. PATENT DOCUMENTS

| | | | | |
|---|---|---|---|---|
| 9,363,003 | B2 | 6/2016 | Ishihara et al. | |
| 10,727,917 | B2 | 7/2020 | Athley et al. | |
| 10,791,561 | B2 | 9/2020 | Raghavan et al. | |
| 2005/0105505 | A1* | 5/2005 | Fishler | H04L 27/2613 370/349 |
| 2011/0002412 | A1* | 1/2011 | Hou | H04L 27/2607 375/267 |
| 2011/0013581 | A1* | 1/2011 | Lee | H04W 72/0453 370/329 |
| 2011/0077013 | A1* | 3/2011 | Cho | H04W 72/542 455/445 |
| 2012/0190356 | A1* | 7/2012 | Zhao | H04L 5/0035 455/422.1 |
| 2016/0269158 | A1 | 9/2016 | Soriaga et al. | |
| 2017/0085302 | A1 | 3/2017 | Tong et al. | |
| 2018/0109305 | A1* | 4/2018 | Obara | H04B 7/0695 |
| 2018/0248604 | A1* | 8/2018 | Zhang | H04W 16/26 |
| 2020/0229003 | A1* | 7/2020 | Wang | H04B 7/0452 |

FOREIGN PATENT DOCUMENTS

| | | |
|---|---|---|
| JP | 4040768 B2 | 1/2008 |
| WO | 2020023086 A1 | 1/2020 |
| WO | 2021212473 A1 | 10/2021 |

OTHER PUBLICATIONS

International Search Report and Written Opinion of the International Searching Authority, PCT/CN2020/137664, mailed Sep. 23, 2021, 11 pages.

Ericsson, "On correlations and beam-width," TSG-RAN Working Group 4 (Radio) meeting #93, R4-1914521, Reno, USA, Nov. 18-22, 2019, 8 pages.

Nokia et al., "Simulation analysis of correlation between wanted and in-band unwanted emissions," 3GPP TSG-RAN WG4 Meeting #94-e, R4-2002042, Electronic Meeting, Feb. 24-Mar. 6, 2020, 9 pages.

Kutty, Shajahan et al, "Impact of Intra-cluster Angular Spread on the Performance of NLoS Millimeter Wave Links with Imperfect Beam Alignment," IEEE Transactions on Vehicular Technology, Feb. 28, 2020, 15 pages.

* cited by examiner

METHODS AND DEVICES FOR BEAMFORMING

CROSS REFERENCE TO RELATED APPLICATIONS

This application is a 35 U.S.C. § 371 national stage application of PCT International Application No. PCT/CN2020/137664 filed on Dec. 18, 2020, the disclosure and content of which is incorporated by reference herein in its entirety.

FIELD OF THE INVENTION

The present disclosure generally relates to field of wireless communication, and more specifically, to a method and device for beamforming.

BACKGROUND

This section introduces aspects that may facilitate a better understanding of the disclosure. Accordingly, the statements of this section are to be read in this light and are not to be understood as admissions about what is in the prior art or what is not in the prior art.

Beamforming controls the directionality of the transmission or reception of a signal on an antenna array. Beamforming improves the spectral efficiency by providing a better signal-to-noise ratio (SNR). Working with other antenna technologies such as smart antennas and MIMO, beamforming boosts cell range and capacity. That means, terminal devices can get stronger, clearer signals.

In fourth generation (4G)/fifth generation (5G) networks and wireless fidelity (WIFI), beamforming is widely used to reinforce the power of signal in multi-antenna system. Beamforming is a technique that focuses a wireless signal towards a specific receiving device, rather than having the signal spread in all directions from a broadcast antenna, as it normally would. The resulting more direct connection is more reliable than it would be without beamforming. In beamforming operation, all antennas from a sending device adjust its phase & power when sending signals, to form an electromagnetic wave "beam" from the antenna to one or multiple user equipment. The stronger the beam power is, the clearer signal and power gain, a terminal device can receive.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In the beamforming, the signal from each antenna may be amplified by a different "weight." Different weighting patterns can be used to achieve the desired sensitivity patterns. A main lobe is produced together with nulls and sidelobes. As well as controlling the main lobe width (beamwidth) and the sidelobe levels, the position of the main lobe width can be controlled. Generally, the network node firstly collects channel information of the terminal device, and then calculates the corresponding phase and power of each antenna, so as to obtain the "beam" that pointing to UE accurately.

In actual application, beamforming is a good solution, since it can concentrate all power of the antennas to a special direction, therefore, the terminal device can get higher receiving power gain than without beamforming, and Signal to Interference plus Noise Ratio (SINR) of the terminal devices on the cell edge is improved. However, beamforming also has some drawbacks. As the power of antennas injecting to the special direction, the power outside the direction area is weaker than usual or even zeroed. There are two challenges: 1) UE is moving out the direction area; 2) UE channel is changing, which is caused by, for example, reflection condition changes, weather condition (rain, frog, wind, etc). In above cases, the beam cannot follow up with the latest UE position or channel status, transmitting power of the UE is dropped. Consequently, the SINR of the UE is going to be low, and Block Error Ration (BLER) will be high. In the worst case, data transmission is suspended since UE is totally out of the original channel.

The general method of overcoming the above problem, is to refresh the uplink channel state of the UE more frequently, then the base station can always get the latest channel information, so as to update the beam direction on downlink to follow up with the changes of the channel states from the UE. But the drawback of the general method is that, one UE might occupy more reference signal resources. Since the reference signal resources on air interface resource is limited, the more frequently the channel state refreshes, the less UEs can utilize the reference signal resources.

To overcome or mitigate at least one of the above mentioned problems or other problem(s), various embodiments of the present disclosure propose a solution for beamforming, which can enable a network node to generate a suitable beam, e.g. a suitable beam width or shape, according to changes of UE' channel in real time, so as to improve throughput of the UE, improve SINR of the UE, and reduce the BLER of the UE.

According to a first aspect of the present disclosure, there is provided a method implemented at a network node (e.g., a base station). The method comprises obtaining channel information of a terminal device. In accordance with an exemplary embodiment, the method further comprises determining a self-correlation factor of the terminal device according to the channel information. In accordance with an exemplary embodiment, the method further comprises determining main lobe width according to a relationship between self-correlation factor and main lobe width. In accordance with an exemplary embodiment, the method further comprises determining a weight vector on at least one transmitting antenna according to the determined main lobe width. In accordance with an exemplary embodiment, the method further comprises transmitting a message using the weight vector on the at least one transmitting antenna, to the terminal device.

In accordance with an exemplary embodiment, the channel information of the terminal device may be obtained via an uplink reference signal or channel state information (CSI) report.

In accordance with an exemplary embodiment, the uplink reference signal or the CSI report may be received periodically and/or aperiodically.

In accordance with an exemplary embodiment, the self-correlation factor of the UE may be determined according to the channel information within a time interval.

In accordance with an exemplary embodiment, a time length of the time interval may be an integer multiple of a period of the reference signal.

In accordance with an exemplary embodiment, the uplink reference signal comprises at least one of a souring reference signal (SRS), a demodulation reference signal, DMRS.

In accordance with an exemplary embodiment, the method further comprises comparing the determined main lobe width with an initial main lobe width to obtain a difference between the determined main lobe width and an initial main lobe width. The method further comprises obtaining a scale-vector corresponding to the difference according to a relationship between differences and scale-vectors. The method further comprises determining the weight vector on the at least one transmitting antenna according to the scale-vector and an initial weight vector corresponding to the initial main lobe width.

In accordance with an exemplary embodiment, the method further comprises comparing the determined main lobe width with an initial main lobe width to obtain a difference between the determined main lobe width and an initial main lobe width. The method further comprises determining whether the difference is greater than a threshold, when the difference is less than or equal to the threshold, the weight vector may be determined according to an initial weight vector corresponding to the initial main lobe. When the difference is greater than the threshold, a scale-vector corresponding to the difference according to a relationship between differences and scale-vectors may be obtained, the weight vector on the at least one transmitting antenna may be determined according to the scale-vector and the initial weight vector corresponding to the initial main lobe width.

In accordance with an exemplary embodiment, the channel information may be channel information of line of sight (LOS) channel.

In accordance with an exemplary embodiment, the channel information may be channel information of non line of sight (NLOS) channel.

In accordance with an exemplary embodiment, the main lobe width may be a half-power beam width (HPBW).

According to a second aspect of the present disclosure, there is provided a method implemented at a terminal device. The method comprises receiving a message by using a weight vector from the network device, wherein the weight vector is determined according to a self-correlation factor of the terminal device according to the channel information.

In accordance with an exemplary embodiment, the channel information may be determined via an uplink reference signal or channel state information (CSI) report.

In accordance with an exemplary embodiment, the uplink reference signal or the CSI report may be sent periodically and/or aperiodically.

In accordance with an exemplary embodiment, the uplink reference signal comprises at least one of a souring reference signal (SRS), a demodulation reference signal (DMRS).

In accordance with an exemplary embodiment, before the terminal device receives the message by using the weight vector from the network node, the method further comprises transmitting the uplink reference signal or the CSI report to the network node.

In accordance with an exemplary embodiment, the channel information may be channel information of line of sight (LOS) channel.

In accordance with an exemplary embodiment, the channel information may be channel information of non line of sight (NLOS) channel.

In accordance with an exemplary embodiment, the main lobe width may be a half-power beam width (HPBW).

According to a third aspect of the present disclosure, there is provided a network node. The network node comprises a processor and a memory wherein the memory containing instructions executable by the processor whereby the network node is operative to obtain channel information of a terminal device. According to some exemplary embodiments, the memory containing instructions executable by the processor whereby the network node is at least further operative to determine a self-correlation factor of the terminal device according to the channel information. According to some exemplary embodiments, the memory containing instructions executable by the processor whereby the network node is at least further operative to determine main lobe width according to a relationship between self-correlation factor and main lobe width. According to some exemplary embodiments, the memory containing instructions executable by the processor whereby the network node is at least further operative to determine a weight vector on at least one transmitting antenna according to the determined main lobe width. According to some exemplary embodiments, the memory containing instructions executable by the processor whereby the network node is at least further operative to transmit a message using the weight vector on the at least one transmitting antenna, to the terminal device.

In accordance with some exemplary embodiments, the memory containing instructions executable by the processor whereby the network node is at least further operative to at least to perform any step of the method according to the first aspect of the present disclosure.

According to a fourth aspect of the present disclosure, there is provided a network node. The network node may comprise an obtaining unit, determining unit and a transmitting unit. In accordance with some exemplary embodiments, the obtaining unit may be operable to carry out at least the obtaining step according to the first aspect of the present disclosure, the determining unit may be operable to carry out at least the determining step of the method according to the first aspect of the present disclosure. The transmitting unit may be operable to carry out at least the transmitting step of the method according to the first aspect of the present disclosure.

According to a fifth aspect of the present disclosure, there is provided a terminal device. The terminal device a processor and a memory wherein the memory containing instructions executable by the processor whereby the terminal device is operative to receive a message by using a weight vector from the network device, wherein the weight vector is determined according to a self-correlation factor of the terminal device according to the channel information.

In accordance with some exemplary embodiments, the memory containing instructions executable by the processor whereby the terminal device is operative to, at least to perform any step of the method according to the second aspect of the present disclosure.

According to a sixth aspect of the present disclosure, there is provided a terminal device. The network node may comprise a transmitting unit. In accordance with some exemplary embodiments, the transmitting unit may be operable to carry out at least the transmitting step according to the second aspect of the present disclosure.

According to a seventh aspect of the present disclosure, there is provided a computer-readable storage medium storing instructions which when executed by at least one processor, cause the at least one processor to perform any step of the method according to the first aspect of the present disclosure.

According to an eighth aspect of the present disclosure, there is provided a computer-readable storage medium storing instructions which when executed by at least one processor, cause the at least one processor to perform any step of the method according to the second aspect of the present disclosure.

According to a ninth aspect of the present disclosure, there is provided a computer program product being tangibly stored on a computer readable storage medium and comprising instructions which, when executed on a processor of a network device cause the network device to perform any step of the method according to the first aspect of the present disclosure.

According to tenth aspect of the present disclosure, there is provided a computer program product being tangibly stored on a computer readable storage medium and comprising instructions which, when executed on a processor of a network device cause the network device to perform any step of the method according to the second aspect of the present disclosure.

According to eleventh aspect of the present disclosure, there is provided a method implemented in a communication system. The communication system includes a host computer, a network device and a terminal device. The method comprises at the host computer, receiving user data originating from a transmission from the terminal device to the network device. The network device is configured to perform the method according to any step of the method according to the first aspect of the present disclosure. The terminal device is configured to perform any step of the method according to the first aspect of the present disclosure.

According to twelfth aspect of the present disclosure, there is provided a method implemented in a communication system. The communication system comprises a host computer, a network device and a terminal device. The method comprises at the host computer, initiating a transmission carrying user data to the terminal device via the network device. The network device is configured to perform any step of the method according to the first aspect of the present disclosure. The terminal device is configured to perform any step of the method according to the second aspect of the present disclosure.

According to thirteenth aspect of the present disclosure, there is provided a communication system including a host computer. The host computer comprises a processing circuitry configured to provide user data and a communication interface configured to receive user data originating from a transmission from a terminal device to a network device. The network device comprises a processor and a memory, the memory containing instructions executable by the processor, whereby the network device is configured to perform any step of the method according to the first aspect of the present disclosure. The terminal device comprises a processor and a memory, the memory containing instructions executable by the processor, whereby the terminal device is configured to perform any step of the method according to the second aspect of the present disclosure.

According to fourteenth aspect of the present disclosure, there is provided a communication system including a host computer. The host computer comprises a processing circuitry configured to provide user data and a communication interface configured to initiate a transmission carrying user data to a terminal device via a network device. The network device comprises a processor and a memory, the memory containing instructions executable by the processor, whereby the network device is configured to perform any step of the method according to the first aspect of the present disclosure. The terminal device comprises a processor and a memory, the memory containing instructions executable by the processor, whereby the terminal device is configured to perform any step of the method according to the second aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
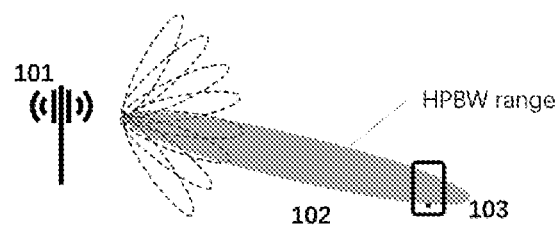
FIG. 1 schematically illustrates a diagram of beam forming and HPBW concept.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device (e.g., a user equipment (UE), a mobile station (MS), a portable communication device, etc.) accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 schematically illustrates a diagram of beam forming and HPBW concept. Wireless communication networks include at least one network node, i.e., a base station, which typically transmits downlink (DL) signals to multiple wireless devices and receives uplink (UL) signals from the wireless devices. FIG. 1 shows an exemplary wireless network comprising a network node 101 and a user equipment (UE) 103. This example illustrates Single-user multiple input and multiple output (SU-MIMO) example with beamforming. The network node 101 encodes a signal for transmission to the UE 103 through an antenna array. With the beamforming technique, the signal is encoded and form up a "beam" by adjusting the amplitude and phase of antennas in the antenna array. There will be one strongest beam (main lobe)102 and several side lobes. To simplify the picture and description of this solution, only the main lobe is drew in grey area, and the side lobes are just illustrated as dotted line, because from equivalent isotropically radiated power (EIRP) power point of view the side lobes has weaker power than main lobe.

Generally, the UE should be inside the area of half power beam width (HPBW) range. The HPBW is the angular separation in which the magnitude of the radiation pattern decreased by 50% (or −3 dB) from the peak of the main lobe. When the UE stays inside the area of HPBW range, the Rx power of the UE is good enough, with good SINR.

Figure 2A:
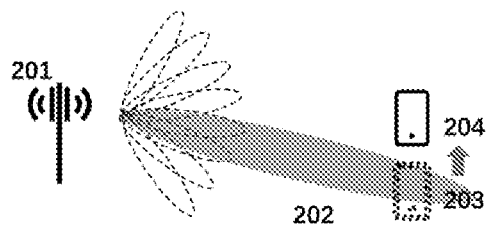
FIGS. 2A-2B schematically illustrates a diagram of beam forming when UE moves or channel changes with narrow beam.

However, if the UE is moving, or channel status is changed (such as rain, frog, or not line of sight (NLOS) reflection), the UE may be out of the area of HPBW range, as illustrated in FIG. 2A. In FIG. 2A, a network node (or base station) 201 encodes a signal for transmission to a UE 203 through an antenna array. The strongest beam 202 just points to the exact UE location. However, this UE is not a stationary UE, but moving by a certain velocity against a different direction from the beam 202 direction. If velocity of the UE is fast enough, it may have already been moving outside the HPBW area.

Figure 2B:
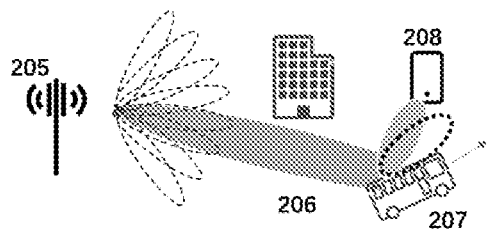

Another situation is reflection as shown in FIG. 2B, and similar things like weather change (rain, frog, etc.). In this situation, the beam 206 is reflected by a moving object 207 (e.g., a bus) or refracted before reaching a UE 208. As the channel status is changes, previous beam estimation may not be so accurately pointing to the target UE 208 any longer.

In above cases, the channel status changes. When these situations happen, the EIRP power of UE receiving signals is not as strong as expected. More than half of the strongest power (or, at least 3 dB) is lost. Due to the signal power is weaken, the SINR will fall dramatically. The success rate of data transmission is going to dropped and re-transmission needed. Consequently, BLER rate is becoming higher and finally data transmission will be suspend due to too many transmission errors.

To resolve this problem in before-mentioned situation, the general solution is that, the network node will refresh the new channel status, to adjust the beam 202/206 to the correct direction. However, before the next channel refresh comes, there is no chance to improve the beam shape. Here take 4G/5G network for example, the channel refresh is relying on the reference signal. Here the reference signal is a quite limited resource of air interface. Its capacity is shared by all UEs of the network node. The more frequently UE refresh its channel status, the less other UEs can utilize the reference to refresh their channel.

Figure 3A:
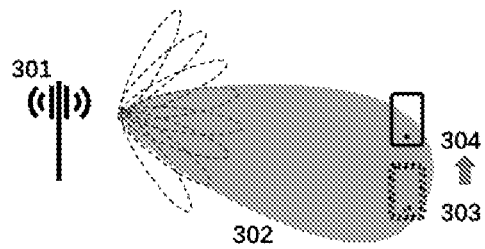
FIG. 3A-3B schematically illustrates a diagram of beam forming when UE moves or channel changes with wide beam.
Figure 3B:
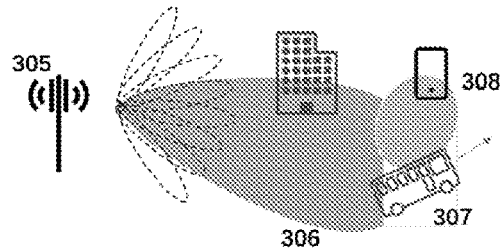

The following embodiments provide a method for beamforming to improve this solution, not only by refreshing the channel status more frequently, but also by adjusting the beam, e.g. the beam width or shape, according to the changes of UE's channel status. If the UE channel status is stable and not changed, the network node generates a normal (or, "narrow") beam pointing to the UE. When UE movement/channel change is detected by the self-correlation factor as stated below, a more "robustness" beam ("wide" HPBW) is generated by the network node, so that the new ("wide" HPBW) beam may adapt to the new channel situation as shown in FIGS. 3A-3B.

Figure 4:
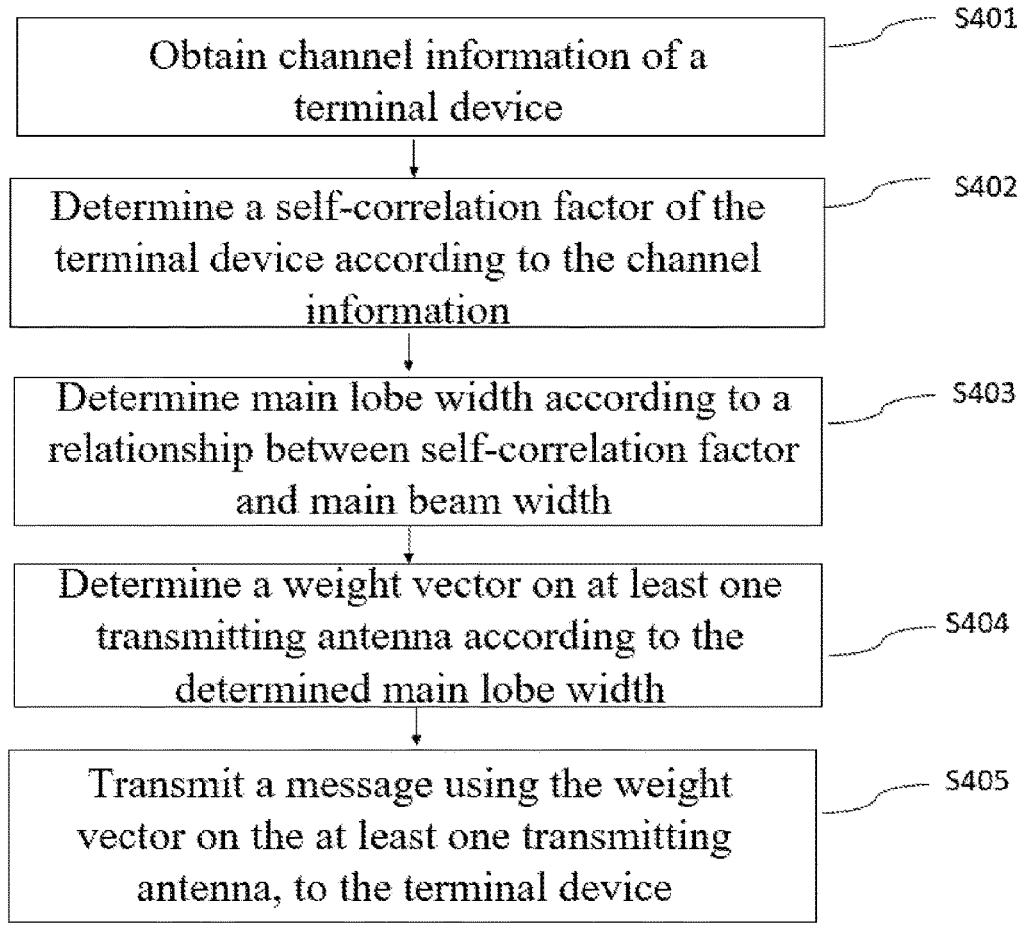
FIG. 4 schematically illustrates a follow chart of a method for beamforming according to an exemplary embodiment of the present invention.

FIG. 4 schematically illustrates a follow chart of a method 400 for beamforming according to an exemplary embodiment of the present invention.

According to the exemplary method 400 illustrated in FIG. 4, a network node may obtain channel information, as shown in block 401. In accordance with an exemplary embodiment, the network node may determine a self-correlation factor, as shown in block 402. In accordance with an exemplary embodiment, the network node may determining a main lobe width according to a relationship between self-correlation factor and main lobe width, as shown in block 403. In accordance with an exemplary embodiment, the network node may determine a weight vector on at least one transmitting antenna according to the determined main lobe width, as shown in block 404. In accordance with an exemplary embodiment, the network node may transmit a message using the weight vector on the at least one transmitting antenna, to the terminal device, as shown in block 405. With this method, the network node is able to generate a suitable beam according to changes of UE's channel in real time.

In accordance with an exemplary embodiment, the network node may obtain the channel information of the terminal device via an uplink reference signal or channel state information (CSI) report.

In accordance with an exemplary embodiment, the uplink reference signal or the CSI report may be sent periodically and/or aperiodically.

In accordance with an exemplary embodiment, the self-correlation factor of the UE may be determined according to the channel information within a time interval.

In accordance with an exemplary embodiment, a time length of the time interval may be an integer multiple of a period of the reference signal.

In an example, the self-correlation factor of the UE is determined according to following way:

$$SelfCoherence_{u_0}(t) = \frac{|H_{u_0}^H(t) \cdot H_{u_0}(t+\Delta t)|}{|H_{u_0}(t)||H_{u_0}(t+\Delta t)|}$$

Self Coherence$_{u_0}$ (t) is a self-correlation factor of a specific UE.

u$_0$ means for a specific UE.

t means a certain starting time point, while Δt is a short period of time after time t, depending on how frequent the channel status is refreshed. Δt is a time interval, a time length of Δt is an integer multiple of a period of the reference signal.

H$_{u_0}$ (t) is the channel vector of this specific UE at time t. It may be estimated from the uplink reference signal (such as SRS, DMRS), or CSI report obtained by CSI-RS. For multi-antenna system, given UE has in antennas, and network node (base station) has n antennas, this channel vector shall be a n×m matrix.

H$_{u_0}^H$ (t) is the Hermite matrix of H$_{u_0}$(t).

The self-coherence factor (self-correlation factor) has been normalized to be [0.0,1.0]. If this factor is 1, it means the UE channel is steady from time t to time (t+Δt) and does not change at all. While on the other hand, if this factor is 0, it's another extreme case that UE channel is changed dramatically and not correlated at all. A more general scenario for this factor is between 0.0 to 1.0, which means that UE channel is changes, but it still has some relationship.

Figure 5A:
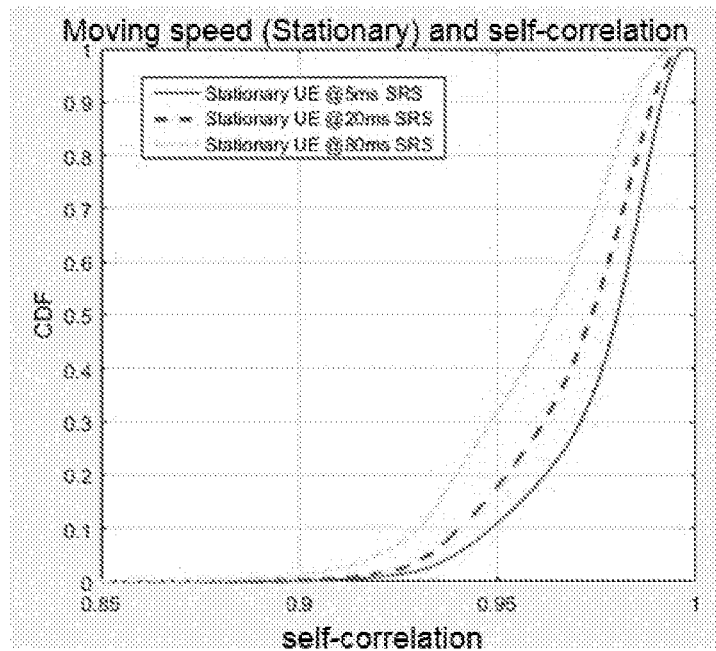
FIGS. 5A-5B schematically illustrate relationship between self-Coherence and UE moving speed.
Figure 5B:
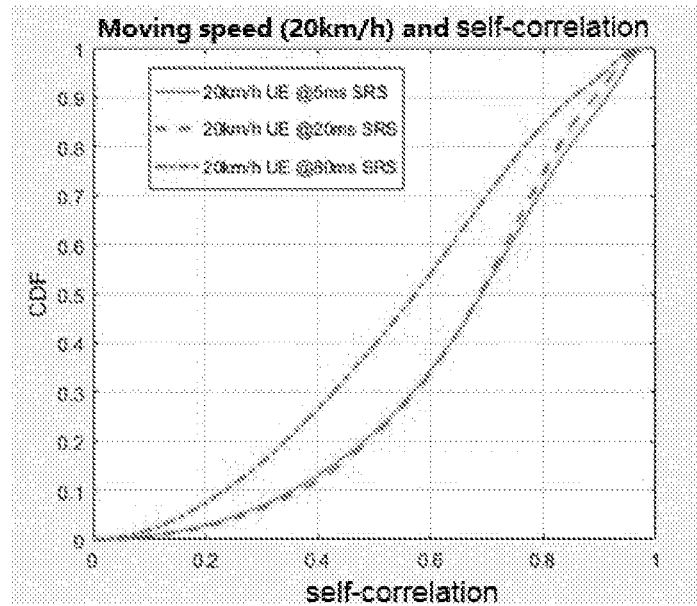

FIG. 5 schematically illustrates relationship between self-Coherence and UE moving speed. The cumulative distribution function (CDF) of the self-coherence and moving speed (stationary, 20 km/h) from field test. From the figure on left, when UE is stationary (not moving), at most of time the self-correlation is above 90%. While from the figure on the right, when UE is moving (20 km/h), the instant self-correlation is mostly between 0.5 to 0.8.

In accordance with an exemplary embodiment, the network may compare the determined main lobe width with an initial main lobe width to obtain a difference between the determined main lobe width and an initial main lobe width, obtain a scale-vector corresponding to the difference according to a relationship between differences and scale-vectors, determine the weight vector on the at least on transmitting antenna according to the scale-vector and an initial weight vector corresponding to the initial main lobe width.

In accordance with an exemplary embodiment, the network node may compare the determined main lobe width with an initial main lobe width to obtain a difference between the determined main lobe width and an initial main lobe width, determine whether the difference is greater than a threshold, when the difference is less than or equal to the threshold, the weight vector may be determined according to an initial weight vector corresponding to the initial main lobe. When the difference is greater than the threshold, a scale-vector corresponding to the difference according to a relationship between differences and scale-vectors may be obtained, the weight vector on the at least on transmitting antenna may be determined according to the scale-vector and the initial weight vector corresponding to the initial main lobe width.

Different telecom equipment providers have different ways for beamforming shape control. Some may utilize a fixed codebook, while the other may utilize real-time calculation of custom beams. However, the target is to generate a specific beam shape by different (amplitude, phase) of every antenna. Let us call the (amplitude, phase) of each antenna as "antenna weights". The network node (base station) need to identify suitable HPBW of generating beam for a UE. As the UE self-correlation factor is calculated in above steps, the network node can utilize this parameter as one important input of HPBW together with other legacy parameters.

Figure 6:
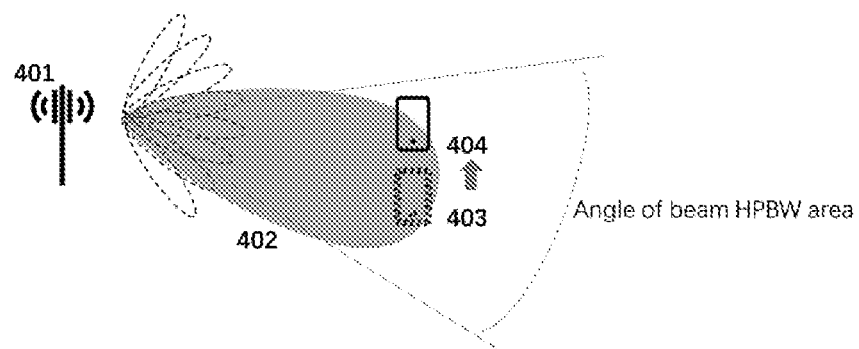
FIG. 6 schematically illustrates beam HPBW area.

The bigger value of UE self-correlation factor (e.g. 0.9999), the smaller HPBW is preferred, because this means the channel of UE is keeping stable and UE doesn't move. The smaller value of UE self-correlation factor (e.g. 0.6), the wider HPBW is preferred, because this means the channel state of the UE is changing or UE is moving. Hence, wider beam is required to ensure the UE to be located inside the HPBW area. The concept of HPBW can be found in FIG. 6. For beam 402, the HPBW area covers a certain angle from network node point of view. The bigger angle of HPBW area, the "wider" beam shape is needed.

An example of the relationship between UE self-correlation factor and the HPBW angle as table below: (channel refresh periodicity is 20 ms).

TABLE 1

Relationship between UE self-correlation and HPBW

| | UE self-correlation factor | | | |
|---|---|---|---|---|
| | [0.0, 0.5] | (0.5~0.7] | (0.8~0.95] | (0.95~1.0] |
| HPBW | 20° | 15° | 10° | 6° or less |

In an example, after the target beam HPBW shape is identified according to table, the network node may determine the weight of each antennas. As indicated before, the implementation of generating different HBPW beams has varies of methods, according to different telecom vendors. An algorithm to broaden the beam width is provided as below.

Figure 7:
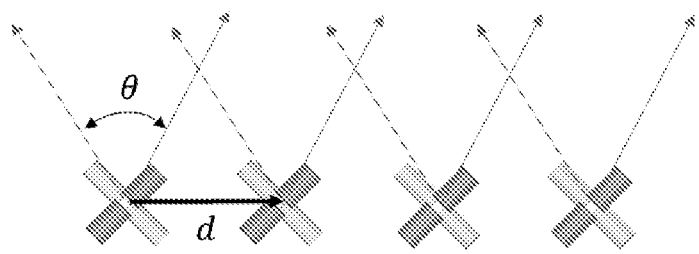
FIG. 7 schematically illustrates a diagram of Antenna Elements with Dual Polarizations.

In this example, Antenna Elements with Dual Polarizations as show in FIG. 7 are used. Here $W_{origin}$ is used to represent the original beamforming weights which is generated to form a beam towards the UE. In most of the antenna array, there are dual polarizations e.g. +45 & −45. Hence we can divide it to $W_{origin}^{+}$ and $W_{origin}^{-}$ for +45 degree and −45 degree respectively, where N is the number of columns, K is the number of rows.

$$W_{origin}^{+} = \begin{bmatrix} w_{11}^{+} & \cdots & w_{1N}^{+} \\ \vdots & \ddots & \vdots \\ w_{K1}^{+} & \cdots & w_{KN}^{+} \end{bmatrix} \quad W_{origin}^{-} = \begin{bmatrix} w_{11}^{-} & \cdots & w_{1N}^{-} \\ \vdots & \ddots & \vdots \\ w_{K1}^{-} & \cdots & w_{KN}^{-} \end{bmatrix}$$

Then two vectors $B^{+}$ & $B^{-}$ are constructed to broaden the beam width on dual polarizations. M is the number of elements which depends on the broadening on horizontal or vertical i.e., column or row. (note this also depends on the mapping between horizontal & vertical to column & row). θ is the angular broadening beam width (E.g. if original beam HPBW is 6° and target HPBW angular is 10° then θ=4°. f is the carrier frequency in Hz, c=3 e8 m/s, and d is the element spacing in horizontal or vertical dimension.

$$B^{+} = [b_1^{+} \ b_2^{+} \ \cdots \ b_M^{+}], b_m^{+} = e^{\frac{j2\pi f}{c} d*(m-1)sin(\theta/2)}$$

$$B^{-} = [b_1^{-} \ b_2^{-} \ \cdots \ b_M^{-}], b_m^{-} = e^{\frac{j2\pi f}{c} d*(m-1)sin(-\theta/2)}$$

Here we use the broadening on columns for example. Note that the broadening on row can use the same principle. n is the index of columns. k is the index of rows. In this case $B^{+}$ and $B^{-}$ are 1×N vectors. By multiplying the $B^{+}$ and $B^{-}$, the +45 beam would be moved to one side by θ/2 degree which −45 beam would be moved to another side by θ/2 degree.

Figure 8A:
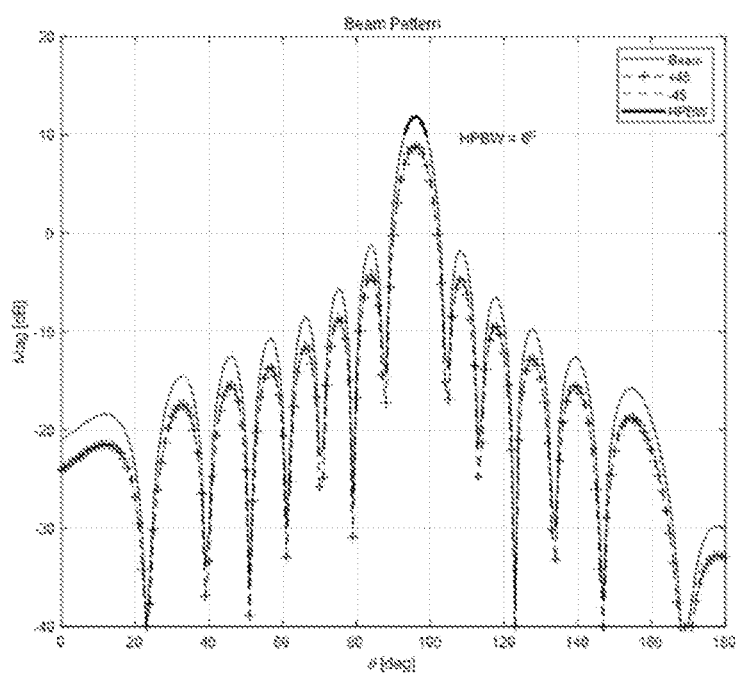
FIG. 8A-8B schematically illustrates a diagram of Beam Pattern of Original Beam Weights and Broadened Beam Pattern.
Figure 8B:
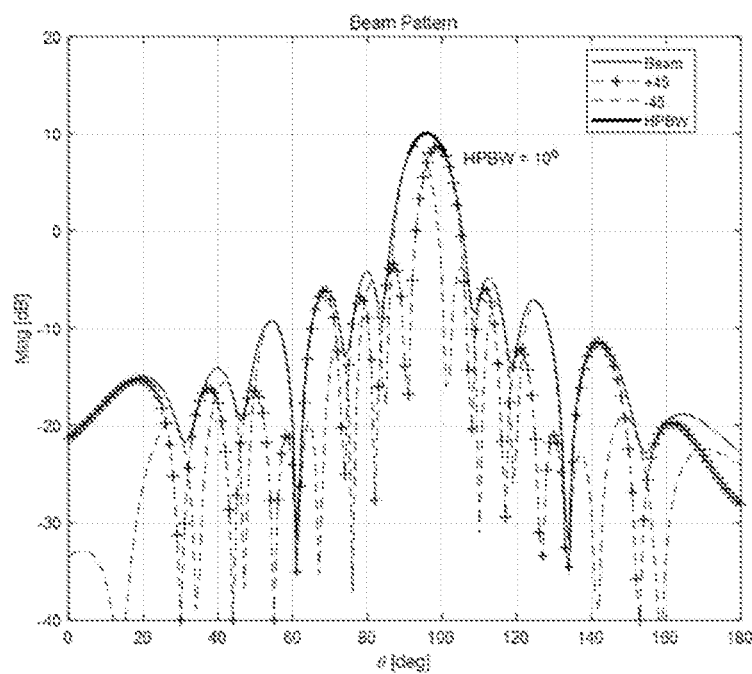

$W_{br}^{+}(n,k)=W_{origin}^{+}(n,k) \cdot B(n)^{+}, n=1 \ldots N, k=1 \ldots K$ $W_{br}^{-}(n,k)=W_{origin}^{-}(n,k) \cdot B(n)^{-}, n=1 \ldots N, k=1 \ldots K$ As shown in FIGS. 8A-8B, the beam width is broadened from 6 deg to 10 deg after multiplying $B^{+}$ and $B^{-}$ in each polarization.

Figure 9:
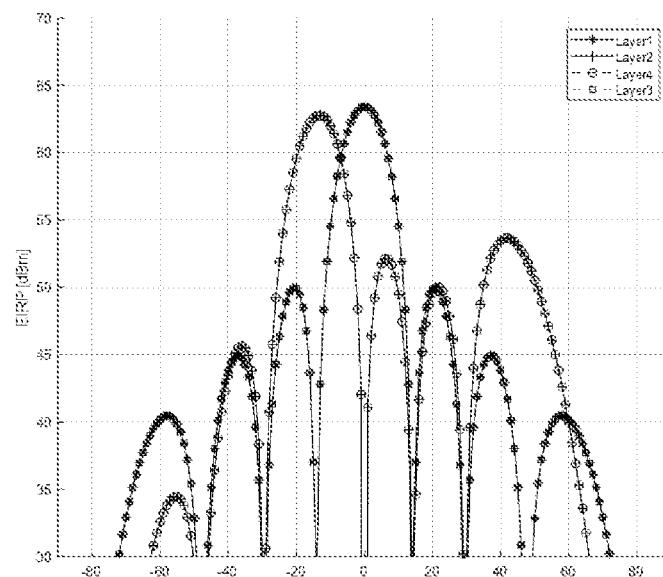
FIG. 9 schematically illustrates a diagram of Broadened Beam Pattern for 4 layers.

This method is also applicable for higher rank situation. For example, transmission mode TM9, UEs may have up to 4 layers. FIG. 9 shows the beam patterns of 4 layers SU-MIMO codebook beamforming. By broadening the beam width of each layer, this solution can be applied to RANK-4 or any RANK beamforming.

The power control of wider HPBW beam shall adapt the rule keeping similar UE receiving EIRP power before this method is applied. For SU-MIMO, the antenna Tx power shall be stronger, so as to obtain similar EIRP power of UE Rx.

In MU-MIMO scenario, that each UE co-scheduled can share different HPBW. Here the power of beam can be dynamic controlled so that beam power shall not be very weak. Due to the power & beam HPBW change, the interference between UEs is a problem. One existed way is using GoB method with appropriated resolution, so that different UE doesn't interference each other.

In accordance with an exemplary embodiment, the channel information is channel information of LOS channel.

In accordance with an exemplary embodiment, the channel information is channel information of NLOS channel.

Figures 10, 11:
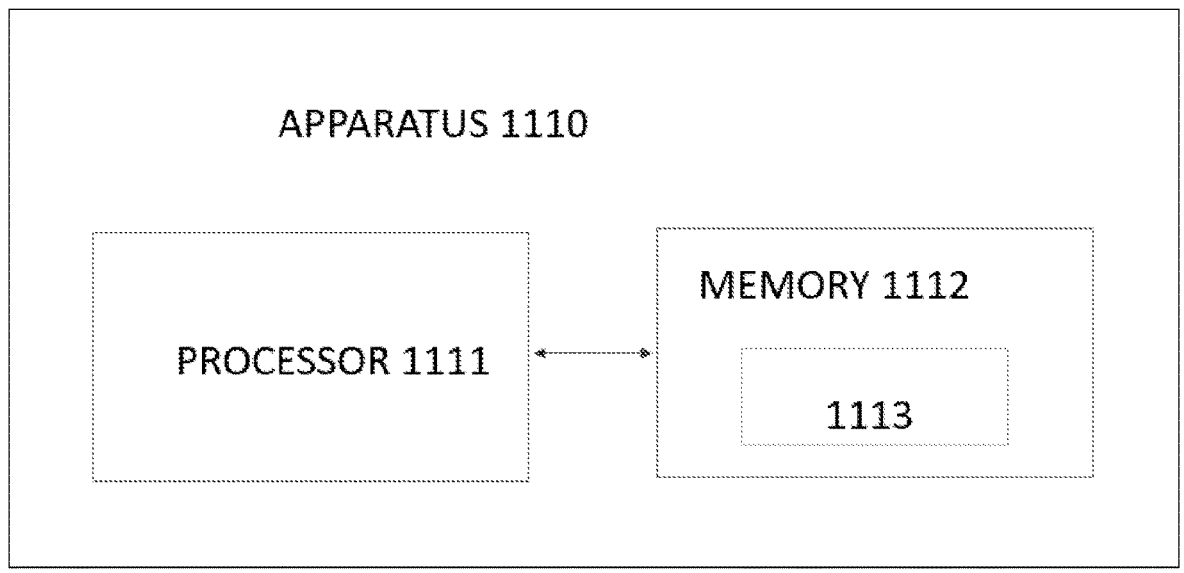
FIG. 10 schematically illustrates a follow chart of a method for beamforming according to an exemplary embodiment of the present invention.
FIG. 11 is a block diagram illustrating an apparatus according to some embodiments of the present disclosure.

In accordance with an exemplary embodiment, the main lobe width is a half-power beam width, HPBW According to the exemplary method 1000 for beamforming illustrated in FIG. 10, a terminal device may receive a message by using a weight vector form a network node, as shown in block 1001.

In accordance with an exemplary embodiment, the channel information may be determined via an uplink reference signal or channel state information (CSI) report.

In accordance with an exemplary embodiment, the uplink reference signal or the CSI report may be sent periodically and/or aperiodically.

In accordance with an exemplary embodiment, the uplink reference signal comprises at least one of a souring reference signal (SRS), a demodulation reference signal (DMRS).

In accordance with an exemplary embodiment, before the terminal device receives the message by using the weight vector from the network node, the terminal device may transmit the uplink reference signal or the CSI report to the network node.

In accordance with an exemplary embodiment, the channel information may be channel information of line of sight (LOS) channel.

In accordance with an exemplary embodiment, the channel information may be channel information of non line of sight (NLOS) channel.

In accordance with an exemplary embodiment, the main lobe width may be a half-power beam width (HPBW).

The various blocks shown in FIGS. 4 and 10 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

FIG. 11 is a block diagram illustrating an apparatus 1110 according to various embodiments of the present disclosure. As shown in FIG. 11, the apparatus 1110 may comprise one or more processors such as processor 1111 and one or more memories such as memory 1112 storing computer program codes 1113. The memory 1112 may be non-transitory machine/processor/computer readable storage medium. In accordance with some exemplary embodiments.

In some implementations, the one or more memories 1112 and the computer program codes 1113 may be configured to, with the one or more processors 1111, cause the network node 1110 at least to perform any operation of the method as described in connection with FIG. 4. In other implementations, the one or more memories 1112 and the computer program codes 1113 may be configured to, with the one or more processors 1111, cause the apparatus 1110 at least to perform any operation of the method as described in connection with FIG. 4 or to perform any operation of the method as described in connection with FIG. 10. Alternatively or additionally, the one or more memories 1112 and the computer program codes 1113 may be configured to, with the one or more processors 1111, cause the apparatus 1110 at least to perform more or less operations to implement the proposed methods according to the exemplary embodiments of the present disclosure.

Figure 12A:
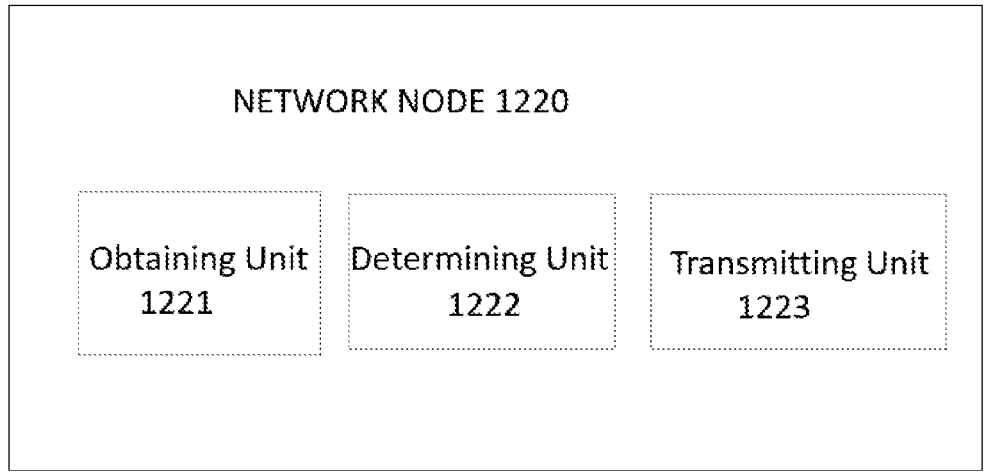
FIG. 12A-12B are block diagrams respectively illustrating a network node and a terminal device according to some embodiments of the present disclosure.

FIG. 12A is a block diagram illustrating a network node 1220 according to some embodiments of the present disclosure. As shown in FIG. 12A, the a network node 1220 may comprise a obtaining unit 1221, a determining unit 1222 and a transmitting unit 1223. The obtaining unit 1221 may be operable to carry out the operation in block 401. The determining unit 1222 may be operable to carry out the operation in block 402-404, and the transmitting unit 1223 may be operable to carry out the operation in block 405. Optionally, the obtaining unit 1220, the determining unit 1221 and/or the transmitting unit 1222 may be operable to carry out more or less operations to implement the proposed methods according to the exemplary embodiments of the present disclosure.

Figure 12B:
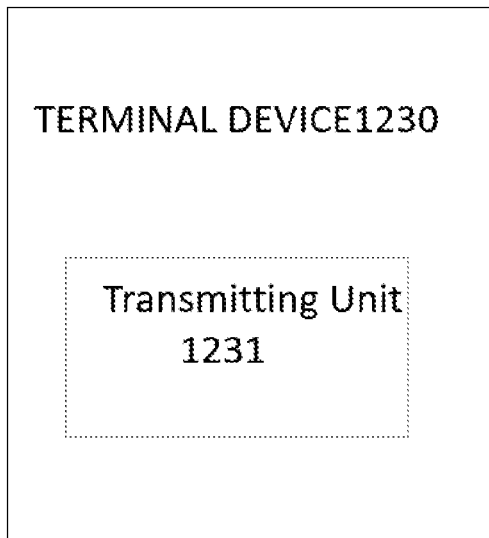

FIG. 12B is a block diagram illustrating a terminal device according to some embodiments of the present disclosure. As shown in FIG. 12B, the apparatus 1230 may comprise a transmitting unit 1231. The transmitting unit 1231 may be operable to carry out the operation in block 1001. Optionally, the transmitting unit 1231 may be operable to carry out more or less operations to implement the proposed methods according to the exemplary embodiments of the present disclosure.

Figure 13:
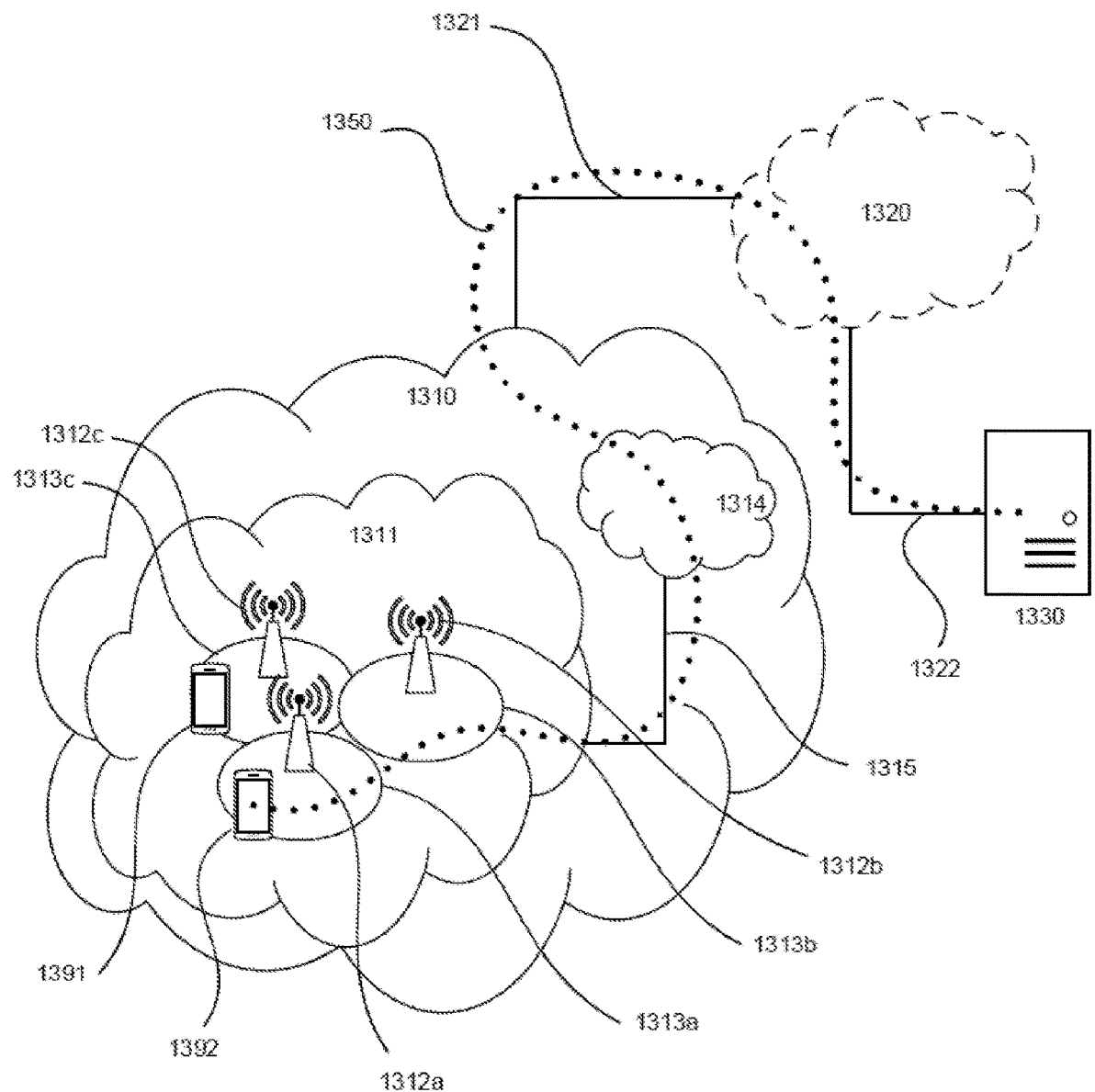
FIG. 13 schematically illustrates a diagram a telecommunication network connected via an intermediate network to a host computer according to some embodiments of the present disclosure.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
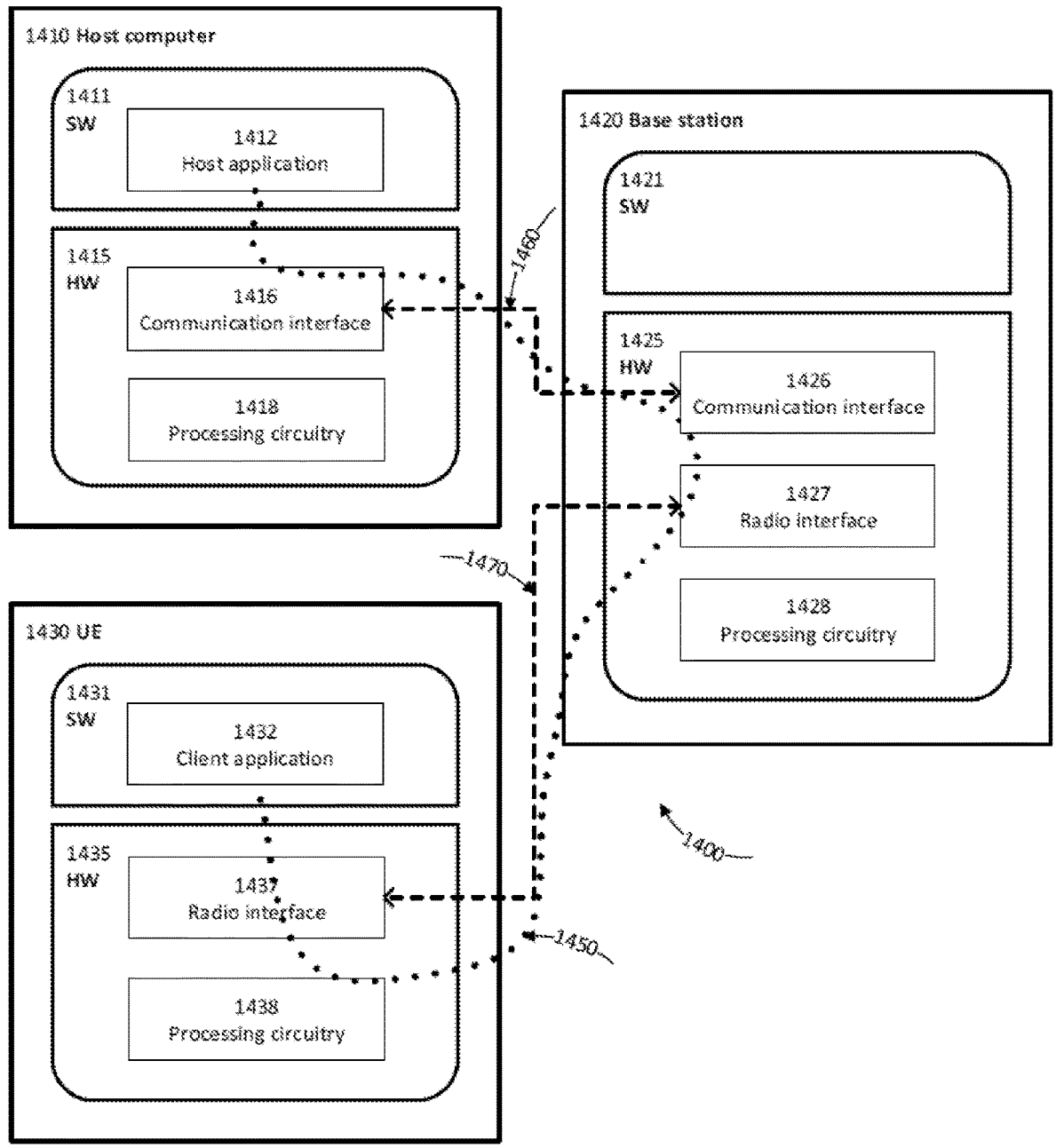
FIG. 14 is a schematic showing a host computer communicating via a base station with a user equipment over a partially wireless connection in accordance with some embodiments.

FIG. 14 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 13) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 13 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
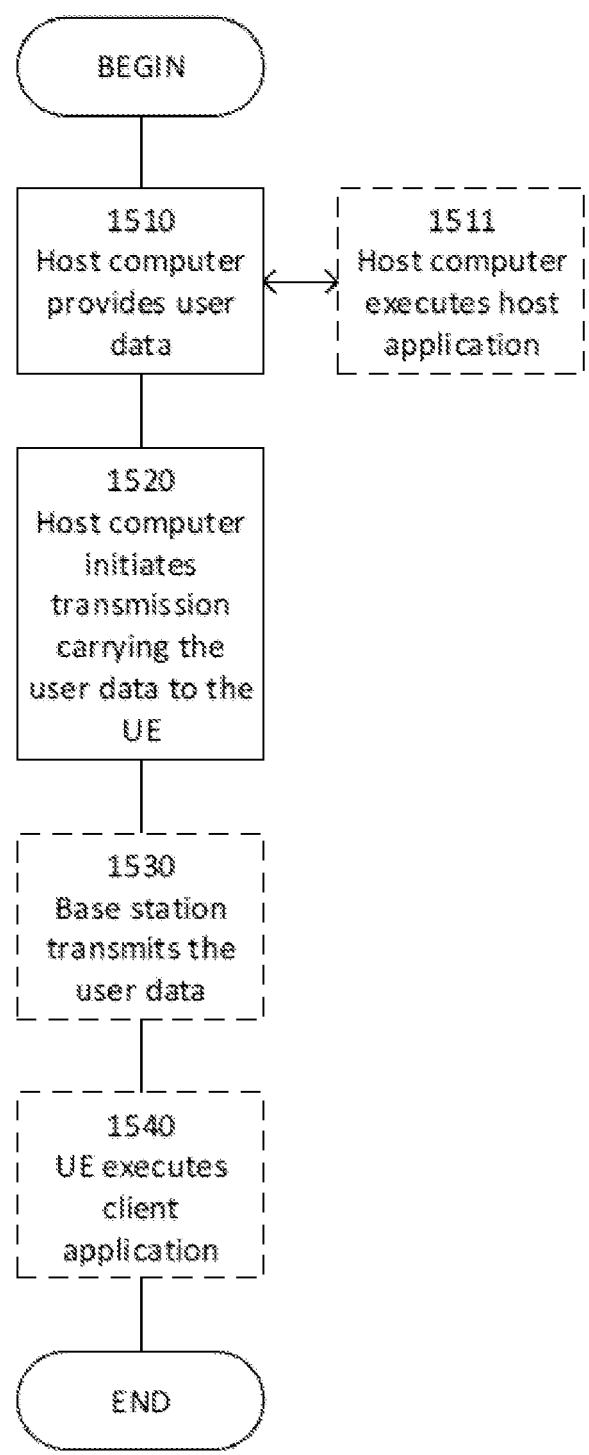
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
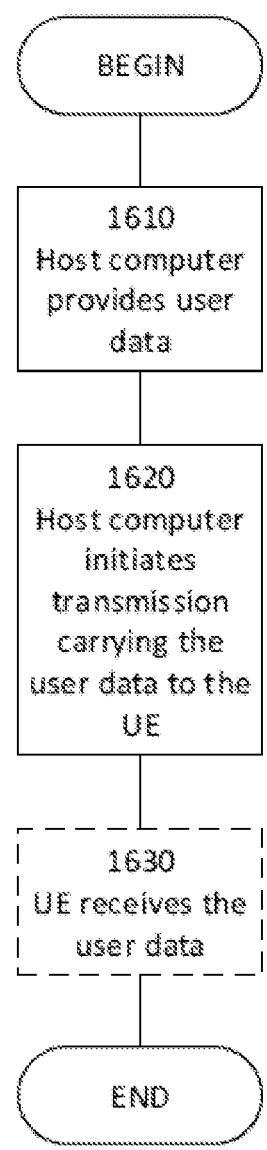
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
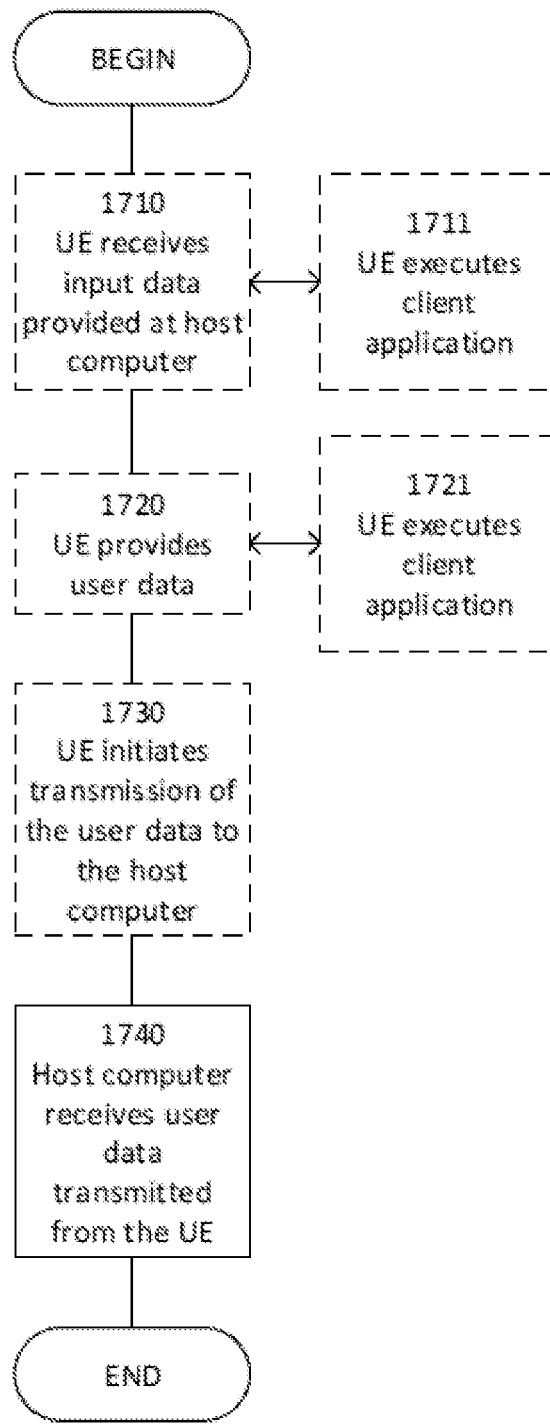
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
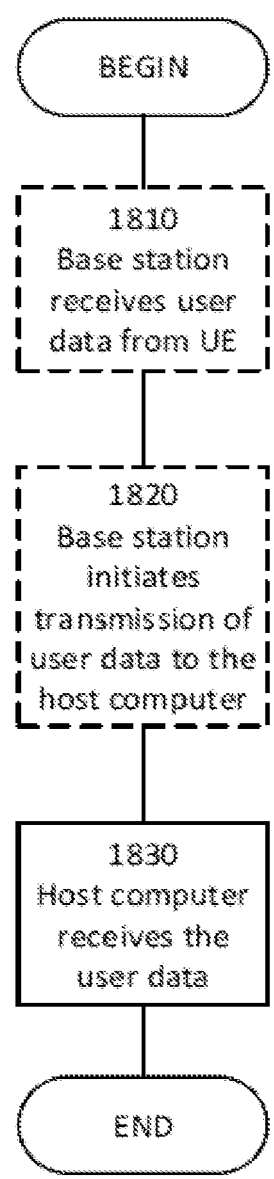
FIG. 18 is a schematic showing methods implemented in a communication system including a host computer, a base station and a user equipment in accordance with some embodiments.

FIG. 18 is a schematic showing methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at a network node, comprising:
obtaining channel information of a terminal device;
determining a self-correlation factor of the terminal device according to the channel information;
determining main lobe width according to a relationship between the self-correlation factor and main lobe width;
determining a weight vector on at least one transmitting antenna according to the determined main lobe width; and
transmitting a message using the weight vector on the at least one transmitting antenna, to the terminal device, wherein determining the weight vector on the at least one transmitting antenna according to the determined main lobe width, comprises:
comparing the determined main lobe width with an initial main lobe width to obtain a difference between the determined main lobe width and an initial main lobe width;
obtaining a scale-vector corresponding to the difference according to a relationship between differences and scale-vectors; and
determining the weight vector on the at least one transmitting antenna according to the scale-vector and an initial weight vector corresponding to the initial main lobe width.

2. The method of claim 1, wherein obtaining the channel information of the terminal device comprises: obtaining the channel information of the terminal device via an uplink reference signal or channel state information (CSI) report.

3. The method of claim 2, wherein the uplink reference signal or the CSI report is received periodically and/or aperiodically.

4. The method of claim 1, wherein determining the self-correlation factor of the terminal device according to the channel information comprises:
determining the self-correlation factor of the terminal device according to the channel information within a time interval.

5. The method of claim 4, wherein a time length of the time interval is an integer multiple of a period of the reference signal.

6. The method of claim 2, wherein the uplink reference signal comprises at least one of a souring reference signal (SRS) a demodulation reference signal (DMRS).

7. The method of claim 1, wherein determining the weight vector on the at least one transmitting antenna according to the determined main lobe width, comprises:
comparing the determined main lobe width with an initial main lobe width to obtain a difference between the determined main lobe width and an initial main lobe width;
determining whether the difference is greater than a threshold;
when the difference is less than or equal to the threshold, determining the weight vector according to an initial weight vector corresponding to the initial main lobe;
when the difference is greater than the threshold, obtaining a scale-vector corresponding to the difference according to a relationship between differences and scale-vectors; and
determining the weight vector on the at least one transmitting antenna according to the scale-vector and the initial weight vector corresponding to the initial main lobe width.

8. The method of claim 1, the channel information is channel information of line of sight (LOS) channel.

9. The method of claim 1, the channel information is channel information of non line of sight (NLOS) channel.

10. The method of claim 1, wherein the main lobe width is a half-power beam width (HPBW).

11. A network node, comprising: a processor and a memory wherein the memory containing instructions executable by the processor whereby the network node is operative to:
obtain channel information of a terminal device;
determine a self-correlation factor of the terminal device according to the channel information;
determine main lobe width according to a relationship between self-correlation factor and main lobe width;
determine a weight vector on at least one transmitting antenna according to the determined main lobe width; and
transmit a message using the weight vector on the at least one transmitting antenna, to the terminal device, wherein determining the weight vector on the at least one transmitting antenna according to the determined main lobe width, comprises:
compare the determined main lobe width with an initial main lobe width to obtain a difference between the determined main lobe width and an initial main lobe width;
obtain a scale-vector corresponding to the difference according to a relationship between differences and scale-vectors; and
determine the weight vector on the at least one transmitting antenna according to the scale-vector and an initial weight vector corresponding to the initial main lobe width.

* * * * *